United States Patent
Roberts et al.

(10) Patent No.: US 10,160,424 B2
(45) Date of Patent: Dec. 25, 2018

(54) TRANSLATIONALLY MANEUVERABLE TRAILER JACK TRACK SYSTEM

(71) Applicants: Dan Roberts, Spanaway, WA (US); John Miller, Spanaway, WA (US)

(72) Inventors: Dan Roberts, Spanaway, WA (US); John Miller, Spanaway, WA (US)

( * ) Notice: Subject to any disclaimer, the term of this patent is extended or adjusted under 35 U.S.C. 154(b) by 315 days.

(21) Appl. No.: 15/019,871

(22) Filed: Feb. 9, 2016

(65) Prior Publication Data

US 2016/0229380 A1    Aug. 11, 2016

Related U.S. Application Data

(60) Provisional application No. 62/114,433, filed on Feb. 10, 2015.

(51) Int. Cl.
*B60D 1/66*  (2006.01)
*B60S 9/04*  (2006.01)

(52) U.S. Cl.
CPC . *B60S 9/04* (2013.01); *B60D 1/66* (2013.01)

(58) Field of Classification Search
CPC .. B60P 3/10; B60P 3/06; B60P 3/1033; B60P 3/1066; B60P 3/1083; B60S 9/04; B60S 9/06; B66F 2700/12; B66F 2700/123; B66F 7/28
See application file for complete search history.

(56) References Cited

U.S. PATENT DOCUMENTS

| | | | |
|---|---|---|---|
| 3,288,435 A | 11/1966 | Starkey | |
| 3,458,173 A | 7/1969 | Kornovich | |
| 3,934,852 A | 1/1976 | Weber et al. | |
| 3,944,259 A * | 3/1976 | Miller | B60D 1/363 280/475 |
| 4,511,159 A | 4/1985 | Younger | |
| 4,674,942 A | 6/1987 | Assh et al. | |
| 4,676,330 A | 6/1987 | Roberts | |
| 4,860,841 A | 8/1989 | Sacco | |
| 4,860,986 A * | 8/1989 | Couzens | B60N 3/103 248/313 |
| 4,911,460 A | 3/1990 | DePaula | |
| 4,961,589 A * | 10/1990 | Faurenhoff | B60D 1/44 248/352 |
| 5,011,119 A | 4/1991 | Harrington | |
| 5,080,386 A | 1/1992 | Lazar | |
| 5,282,515 A | 2/1994 | Bell | |
| 5,295,703 A * | 3/1994 | White | B60D 1/66 254/418 |
| 5,325,934 A | 7/1994 | Larson | |

(Continued)

*Primary Examiner* — Tyrone V Hall, Jr.

(74) *Attorney, Agent, or Firm* — George A. Leone; Citadel Patent Law (57) ABSTRACT

A translationally maneuverable trailer jack track system includes a frame having dual opposing inwardly facing elongated slotted sides. The frame is adapted to mount to a trailer frame between a ball coupler and a trailer. A carriage is mounted inside the frame with opposing side elements, each opposing side element bears on and is movably disposed within one of the dual opposing elongated slotted side elements, where the carriage has a centrally located jack collar and at least one threaded receiving element. A drive screw traverses the frame lengthwise and is threaded through the carriage threaded receiving element, where the drive screw is constrained on one end by a fastening device and has a drive cap on the other end.

5 Claims, 11 Drawing Sheets

(56) References Cited

U.S. PATENT DOCUMENTS

| | | | |
|---|---|---|---|
| 5,454,582 A | 10/1995 | Rines | |
| 5,690,348 A * | 11/1997 | Williams, Jr. | B60D 1/36 254/DIG. 1 |
| 6,193,258 B1 | 2/2001 | Kennedy | |
| 6,206,401 B1 | 3/2001 | Osterback | |
| 6,347,677 B1 | 2/2002 | Collins | |
| 6,926,261 B1 | 8/2005 | Renshaw | |
| 6,945,343 B1 | 9/2005 | Moreau et al. | |
| 6,991,050 B1 | 1/2006 | Sanford et al. | |
| 7,328,761 B1 | 2/2008 | Tyler | |
| 7,651,114 B2 * | 1/2010 | Weber | B60D 1/36 254/419 |
| 7,909,350 B1 | 3/2011 | Landry | |
| 8,091,913 B1 | 1/2012 | White | |
| 8,333,257 B2 | 12/2012 | Bonnardel | |
| 2003/0042707 A1 | 3/2003 | McCarty | |
| 2003/0132605 A1 | 7/2003 | Wiers | |
| 2004/0021292 A1 | 2/2004 | Abair | |
| 2004/0048723 A1 * | 3/2004 | Parrilla | A63B 21/072 482/94 |
| 2007/0152425 A1 | 7/2007 | Richards | |
| 2009/0033061 A1 | 2/2009 | Hensley | |

\* cited by examiner

TRANSLATIONALLY MANEUVERABLE TRAILER JACK TRACK SYSTEM

RELATED APPLICATION

This application claims priority from U.S. application No. 62/114,433 of Roberts and Miller, filed Feb. 10, 2015, entitled "Translationally Maneuverable Trailer Jack Track System." U.S. application No. 62/114,433 of Roberts and Miller is hereby incorporated by reference.

TECHNICAL FIELD

The present invention relates to translationally maneuverable trailer jacks in general, and, more particularly, to a translationally maneuverable trailer jack track system for laterally positioning a coupler over a trailer ball.

BACKGROUND

The task of hooking a trailer to a towing vehicle presents a frustrating challenge to most recreational vehicle (RV) drivers. Typically, horizontal positioning error must be less than ½ inch in all directions to allow mating. Lack of line-of-sight vision to the hitch or ball, and attendant vehicle positioning difficulties are, in the RV community, a legendary recurring irritation even with the assistance of a spotter. When the driver is unaided, this blind spot forces multiple backup cycles: exit vehicle, walk to the rear to observe position, calculate next movement, reenter vehicle, backup once more, and repeat. The weight of the trailer tongue inhibits manual lateral alignment of the trailer hitch, thus requiring the repeated attempts at backward positioning of the vehicle.

The present disclosure provides new and novel solutions to overcome problems inherent in the prior art by, for the first time, providing a translationally maneuverable trailer jack track system. A lateral line of hitch locations viable for hookup, rather than a single point, widens the area of vehicle positioning which permits proper mating of hitch and ball, and expands proportionately the tolerance for side to side positioning error by the driver. As a further feature and benefit, the rearward relocation of the jack on the trailer tongue, required for translational movement between the trailer frame rails, creates space for the tailgate or other rear enclosure of the towing vehicle to open fully and thus allows access to the rear compartment of said towing vehicle. This feature and benefit may be achieved by jack rearward relocation, with or without the translational movement feature.

BRIEF SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment a translationally maneuverable trailer jack track system includes a frame having dual opposing inwardly facing elongated slotted sides. The frame is adapted to mount to a trailer frame between a ball coupler and a trailer. A carriage is mounted inside the frame with opposing side elements, each opposing side element bears on and is movably disposed within one of the dual opposing elongated slotted side elements, where the carriage has a centrally located jack collar and at least one threaded receiving element. A drive screw traverses the frame lengthwise and is threaded through the carriage threaded receiving element, where the drive screw is constrained on one end by a fastening device and has a drive cap on the other end.

In another aspect, a translationally maneuverable trailer jack track system includes a frame including dual opposing elongated slotted sides, the frame being mounted on a trailer frame between first and second angled arms of the trailer frame terminating in a ball coupler. A carriage is mounted to the frame with opposing side elements movably disposed within the dual opposing elongated slotted side elements, where the carriage has a centrally located jack collar and at least one threaded receiving element. A jack having an outer housing is rigidly affixed to the carriage jack collar, where the jack includes a base within the jack housing adapted to firmly contact the ground. A drive screw traverses the frame lengthwise and is threaded through the carriage threaded receiving element, where the drive screw is constrained on one end by a fastening device and has a drive cap on the other end. A pair of parallel axles are attached to the carriage and hold rollers on each end of each axle. The rollers are constrained within the elongated slotted sides; and rotation of the drive screw translationally moves the carriage relatively to a fixed point on the ground causing the coupler to move laterally.

In another aspect, the jack is removable.

Other benefits and advantages of the present invention will become apparent from the disclosure, claims and drawings herein.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

The following disclosure describes several embodiments and systems for a translationally maneuverable trailer jack. Several features of methods and systems in accordance with example embodiments are set forth and described in the Figures. It will be appreciated that methods and systems in accordance with other example embodiments can include additional procedures or features different than those shown in the Figures. Example embodiments are described herein with respect to a translationally maneuverable trailer jack track system using a manual or motorized jack. However, it will be understood that these examples are for the purpose of illustrating the principles, and that the invention is not so limited. Additionally, methods and systems in accordance with several example embodiments may not include all of the features shown in the Figures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or various combinations and variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The system as disclosed herein includes many useful features such as the following:

The system allows removal of construction materials, equipment, recreational items, motorcycles, ATVs, which do not have site access available or have closed rear compartments.

The system alleviates the need for lifting heavy objects over the tailgate for pickups with open beds.

The system eases hitching and unhitching by expanding the accessible area on the front of the tongue through a side-to-side motion. It also adds room to step over the hitch when hooked up, required repeatedly when hitching or unhitching.

A temporary work area on may be created on top of a trailer tongue. This is a significant convenience during the hitch/unhitch procedure to temporarily store tools, safety pins and other fixtures of the process.

Jack back installation using the system requires no drilling or penetration of the trailer frame, the hitch or the vehicle receiver. Frame integrity is not compromised. No hardware is attached to hitch or ball, permanent or temporary.

The system can be used in a "jack back" and side-to-side modes while all factors which determine the geometry and towing characteristics of the vehicle/trailer towing unit, including distance from vehicle to trailer, are undisturbed and unaffected. Brake function, jack operation, utility hookups, safety chains and all trailer connections are untouched.

The system performs and has been tested with weights exceeding 2000 pounds of tongue weight.

A storage container, cooler, or other accessory can be permanently mounted on the trailer tongue when front free space is sufficient.

The system mounting brackets are specifically designed to be adjustable and expandable to allow it to be positioned between obstacles, in the most accessible location on the trailer tongue, and to provide for the future attachment of other accessories.

Most trailers mount the jack facing forward. The unique jack mounting system disclosed herein allows 360 degrees of jack rotation, so it can face in a convenient direction. This improves access to the jack's up/down switch and can avoid conflicts with mounting obstacles. It also provides for an ample side-to-side motion to make it easier to position a trailer hitch.

For configurations that require relocation of the battery(s) and/or propane tank(s) the system can be customized with hold downs for each, that attach to the Jack back system's mounting brackets. They can also be used to add a second or even third battery or propane tank The system works with virtually any jack, electric or manual.

Figure 1:
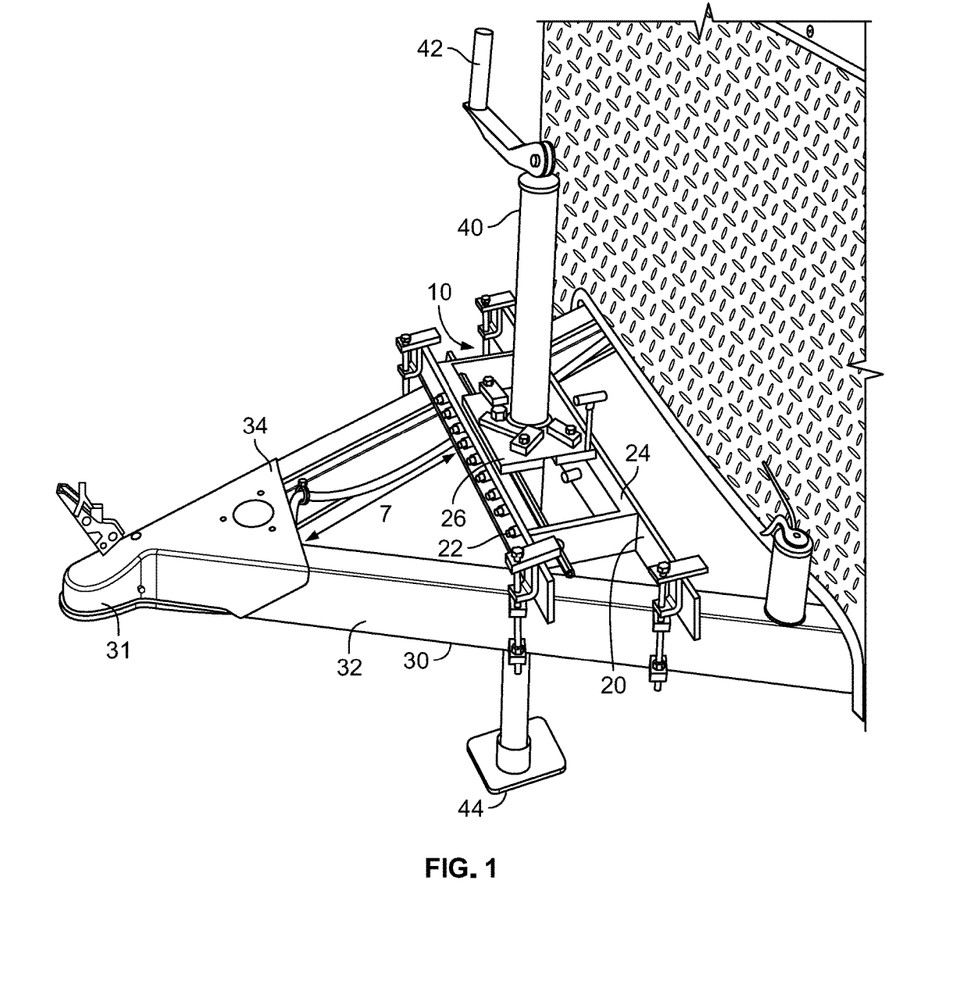
FIG. 1 shows a view of an example of a translationally maneuverable trailer jack track system shown as installed on a trailer mount.

Referring now to FIG. 1, a view of an example of a translationally maneuverable trailer jack track system shown as installed on a trailer mount is shown. A translationally maneuverable trailer jack track system 10 includes a frame 20 including dual opposing elongated slotted side elements 22, 24. A carriage 26 has opposing side elements movably disposed within the dual opposing elongated slotted side elements 22, 24. The frame 20 is here shown mounted on a trailer frame 30 between first and second angled arms 32, 34 of the trailer frame 30 terminating in a ball coupler 31. As the system 10 is typically used, a jack 40, having, for example a jack crank 42 or other means of activation, is fixedly mounted to the carriage 26. When the system is in use, a base 44 of the jack 40 should firmly contact the ground.

Note that the frame 20 may be set back into a "jack back" position so as to allow easy access when the trailer is attached to a vehicle. The jack back position may be adjustable, as indicated by double arrow 7, using suitable fasteners or clamps and leaves a suitable distance back from the ball coupler 31 to allow fully opening a drop down style pick-up truck tailgate or SUV rear door, without bumping the trailer jack. The jack back distance can be set at about 2-3 feet, for example.

Figure 2:
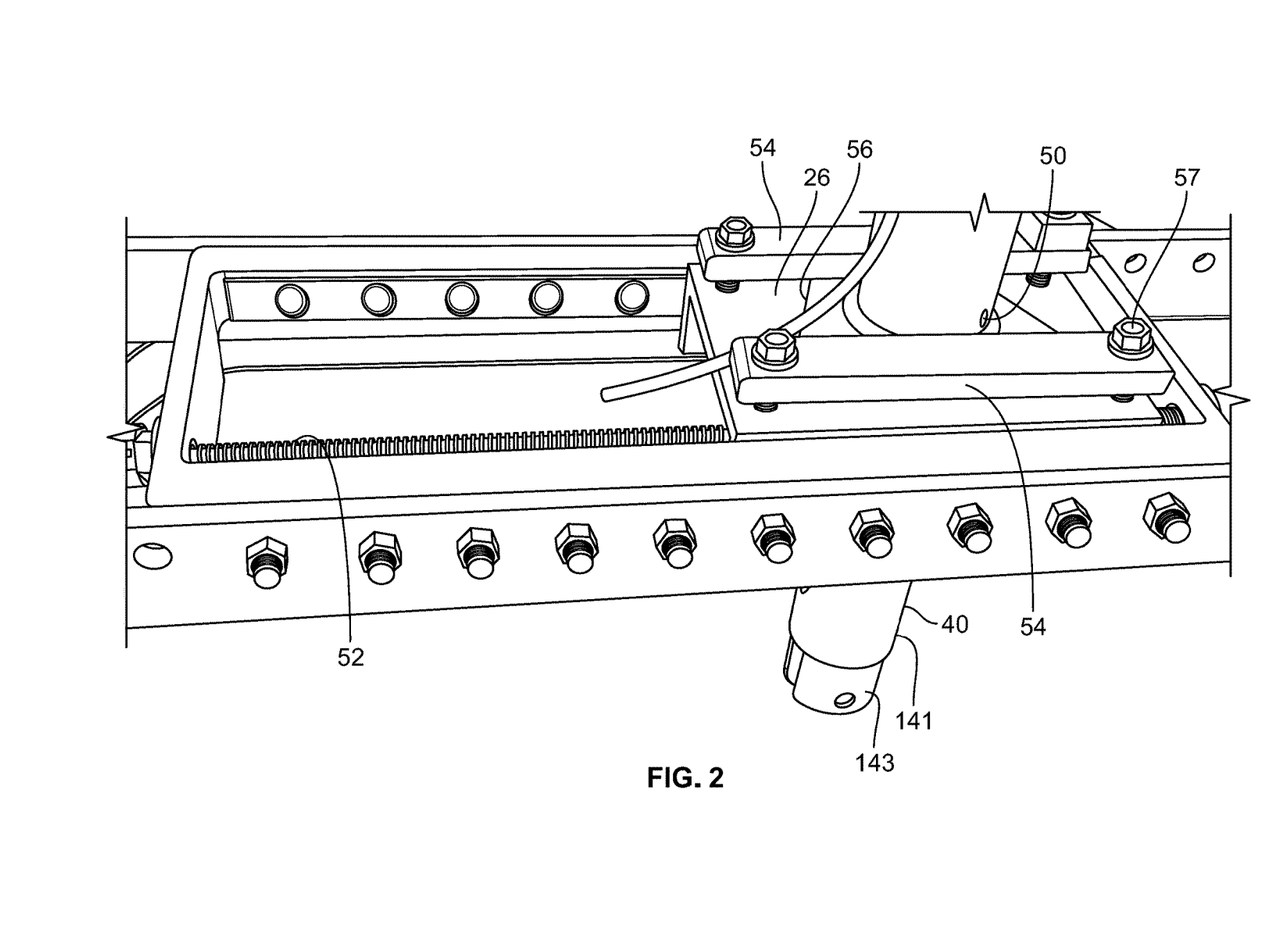
FIG. 2 shows a partial top view of an example of a translationally maneuverable trailer jack frame element with a jack affixed to the carriage.

Referring now to FIG. 2, a partial top view of an example of a translationally maneuverable trailer jack frame element with a jack affixed to the carriage is shown. The carriage 26 has a jack collar 50 centrally located in the carriage element, a drive screw 52 traverses the frame and is threaded through the carriage 26. The jack 40 is fixedly attached to the carriage 26 using, for example, a pair of opposing clamps 54 bearing on a flange 56 or other fixed element of the jack. In one example the opposing clamps 54 may be parallel steel bars fixed to the carriage by, for example, bolts 57, where the clamp may be loosened in order to remove the jack if desired. The jack 40 includes a housing 141 and a telescoping elongated member 143 within the housing 141 which is attached at one end to the base 44.

Figure 3:
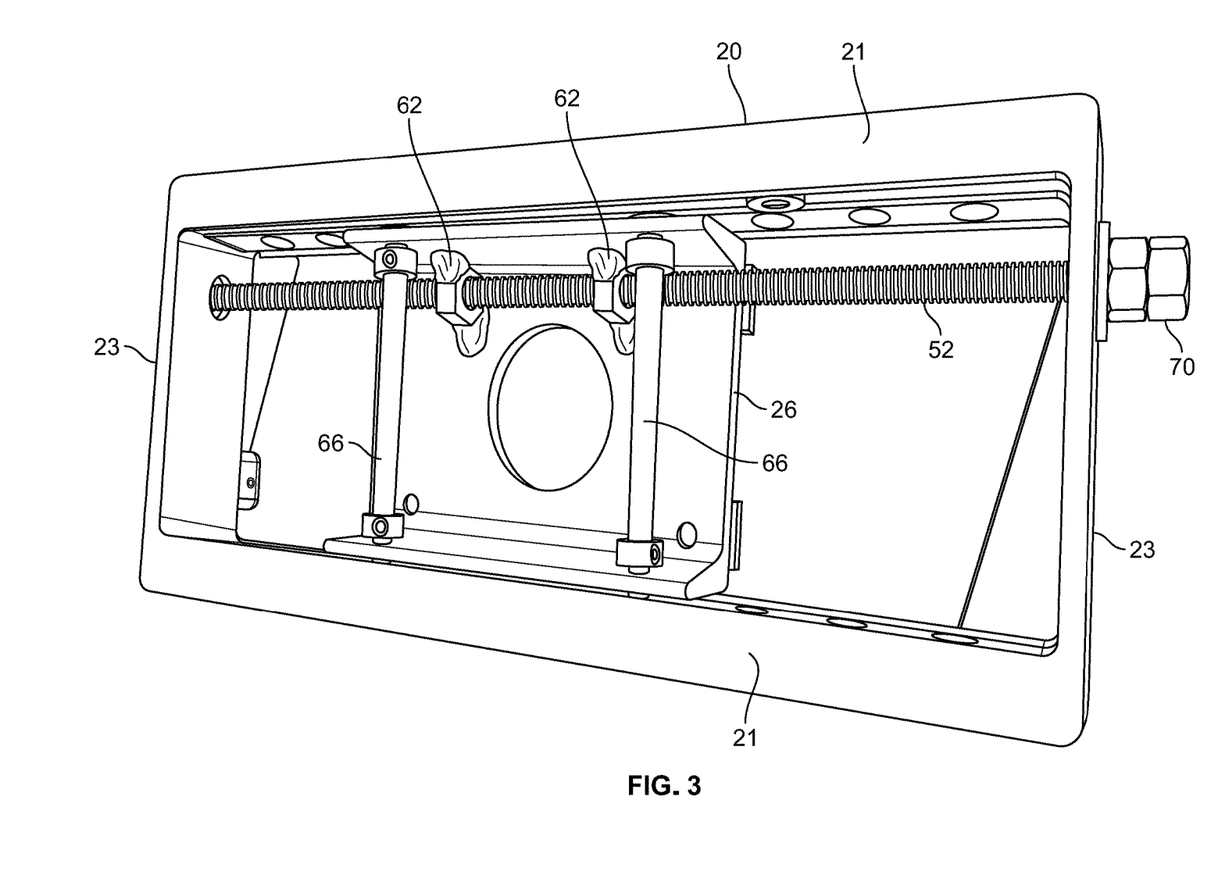
FIG. 3 shows a bottom view of an example of a translationally maneuverable trailer jack track system illustrating details of the carriage drive mechanism.

Referring now to FIG. 3, a bottom view of an example of a translationally maneuverable trailer jack track system illustrating details of the carriage drive mechanism is shown. The carriage 26 has at least one threaded receiving element 62, such as, for example nuts or the like, for receiving the drive screw 52. The drive screw may advantageously run through the frame 20 parallel to opposing parallel frame sides 21 and through the opposing frame ends 23. Also installed within the carriage are parallel axles 66, which, in one example, are attached at the ends to rolling bearing elements (as shown in more detail in FIG. 4). The drive screw 52 is constrained on one end by a fastening device such as a pair of threaded nuts 70 bearing against a washer or the like serving as a retention cap.

Figure 4:
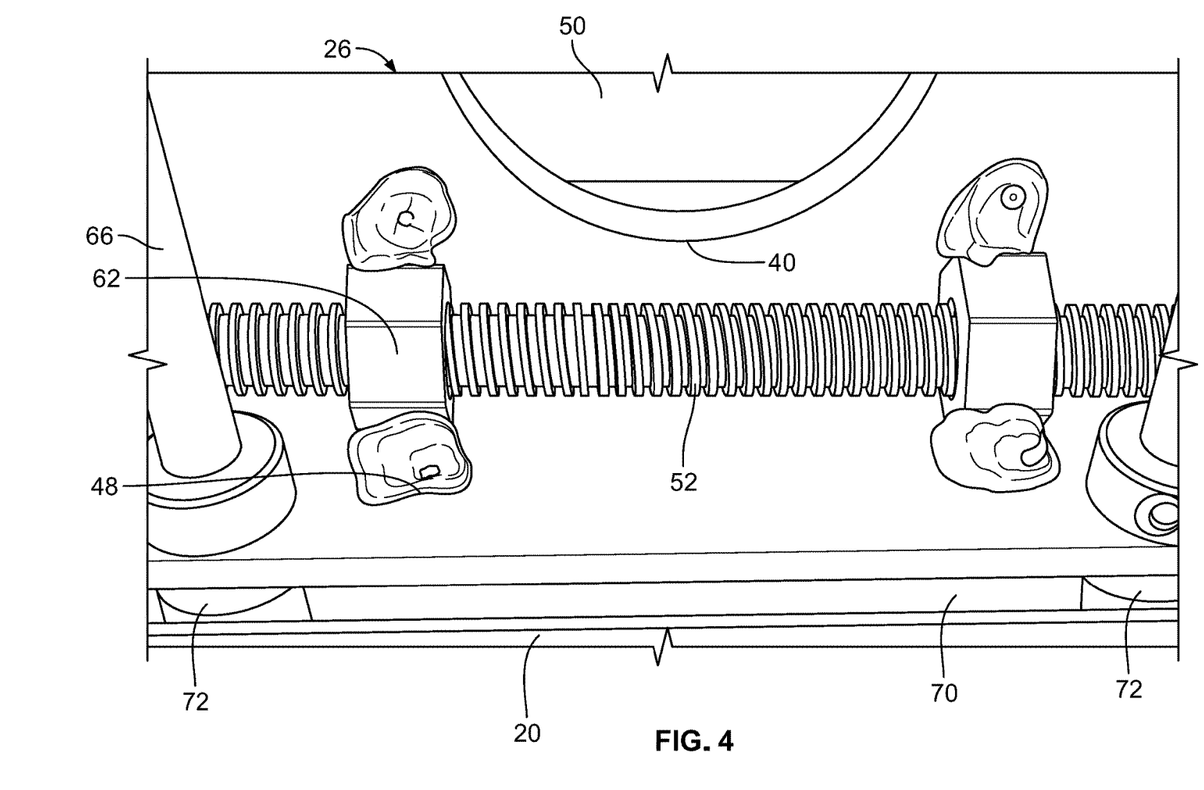
FIG. 4 shows a more detailed view of the underside of a carriage as used in one example of a translationally maneuverable trailer jack track system.

Referring now to FIG. 4, a more detailed view of the underside of a carriage used in one example of a translationally maneuverable trailer jack track system is shown. The carriage 26 includes a fixed mechanism for receiving the drive screw 52, in this example being the pair of nuts 62 securely fastened as, for example, by welding to the carriage. Those skilled in the art will understand that the fixed mechanism and many of the welded parts can be cast as a single integrated unit, for example. The axles 66 are each rotatably attached to rollers 72, such as, for example, steel wheels or roller bearings, at each end. The wheels or roller bearings 72 are constrained within slots 70 on each side of the frame 20, the slots having a width slightly larger than the diameter of the rollers so as to allow free linear movement of the rollers within the tracks.

Figure 5:
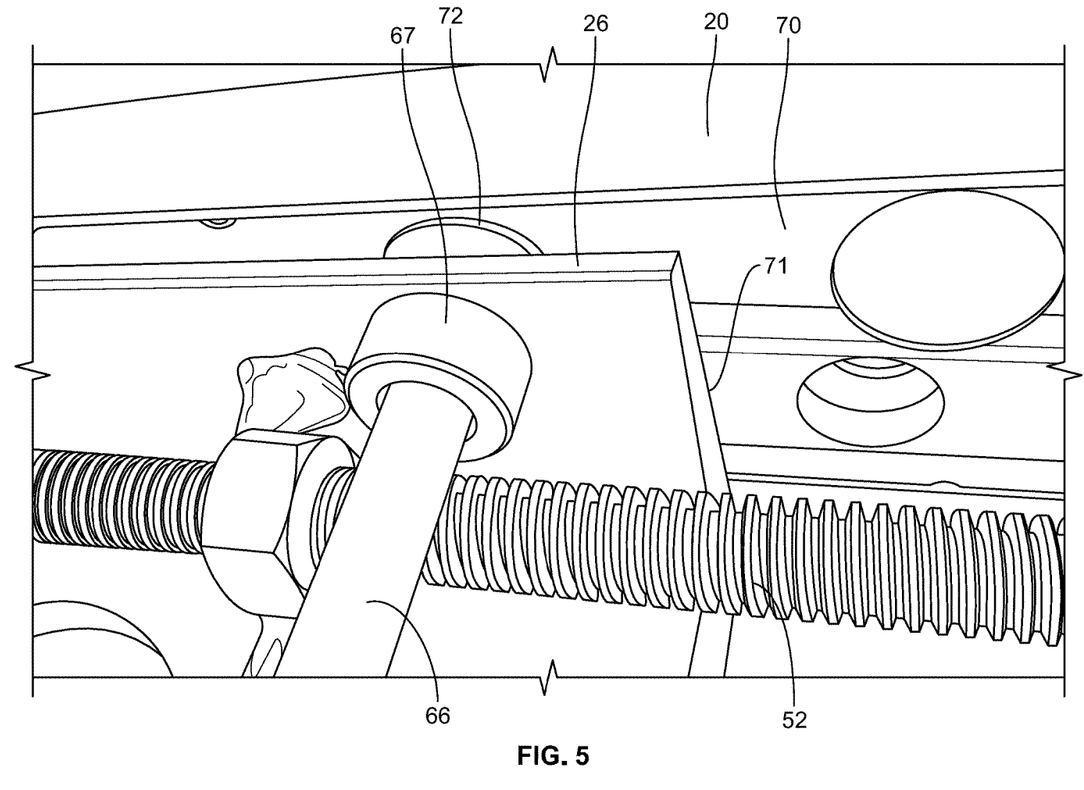
FIG. 5 shows a more detailed view of the underside of one track holding one side of a carriage in place as used in one example of a translationally maneuverable trailer jack track system.

Referring now to FIG. 5, a more detailed view of the underside of one track holding one side of a carriage in place as used in one example of a translationally maneuverable trailer jack track system is shown. One side of the carriage 26 is tracked within a first side slot 70 so that the roller 72 easily rolls within the slot. The first and second parallel axles 66 are mounted through holes in side flanges 71 of the carriage 26 and the rollers are mounted to the axles so as to roll easily within the slots 70. Locking collars 67 or the like may advantageously be used to hold the axles in place.

Figure 6:
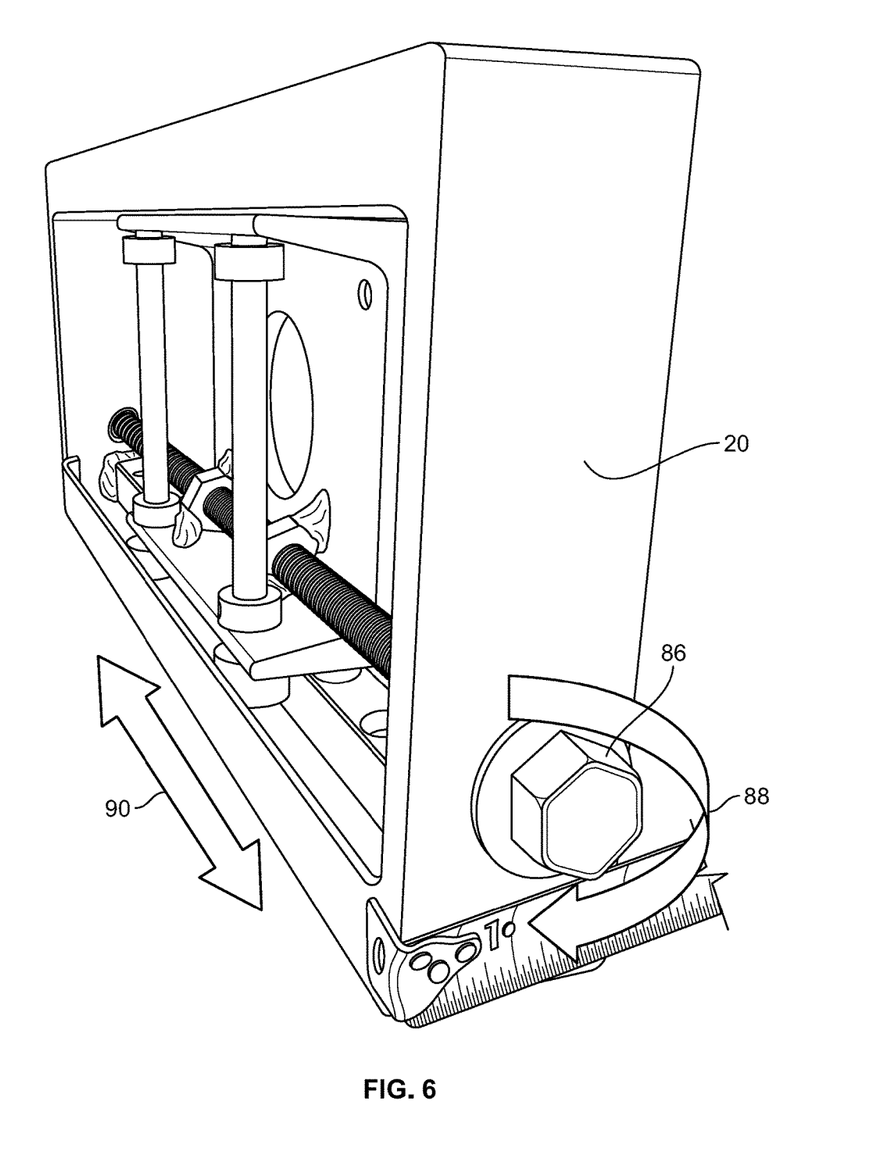
FIG. 6 shows a perspective side view of an example of a translationally maneuverable trailer jack track frame.

Referring now to FIG. 6, a perspective side view of an example of a translationally maneuverable trailer jack track frame is shown. A second side of the frame 20 includes a cap 86 rigidly affixed to the drive screw 52 such that rotational torque 88 in either clockwise or counterclockwise directions applied to the cap 86 will rotate the attached drive screw and translationally move the carriage 26 one way or the other along the frame as indicated by double arrow 90. In one example a flexible torque wrench, drive shaft or the like may be used in turning the drive screw cap 86 so that an operator may be comfortably positioned to drive the carriage in a desired direction. In one embodiment the drive shaft can be turned with a manual crank in either a clockwise or counterclockwise direction.

Figure 7:
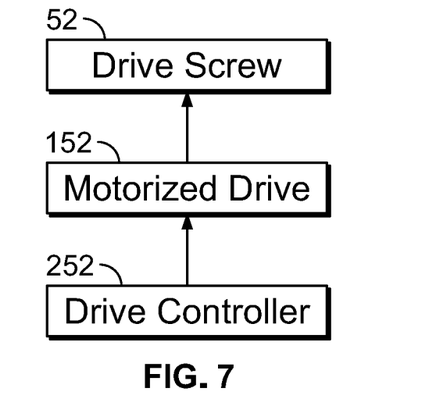
FIG. 7 shows a conceptual illustration of an example of a torque drive for the carriage.

Referring now to FIG. 7, a conceptual illustration of examples of a torque drive for the carriage is shown. In other examples a motorized drive screw or the like can be used. The drive screw 52 can be coupled to a motorized drive 152. A hand held controller 252, such as a two button remote control 140 (as shown in the FIG. 8) or the like can be used to activate the motorized drive. The controller 252 may be coupled to control the motorized drive by wired or wirelessly transmitted signals.

Figure 8:
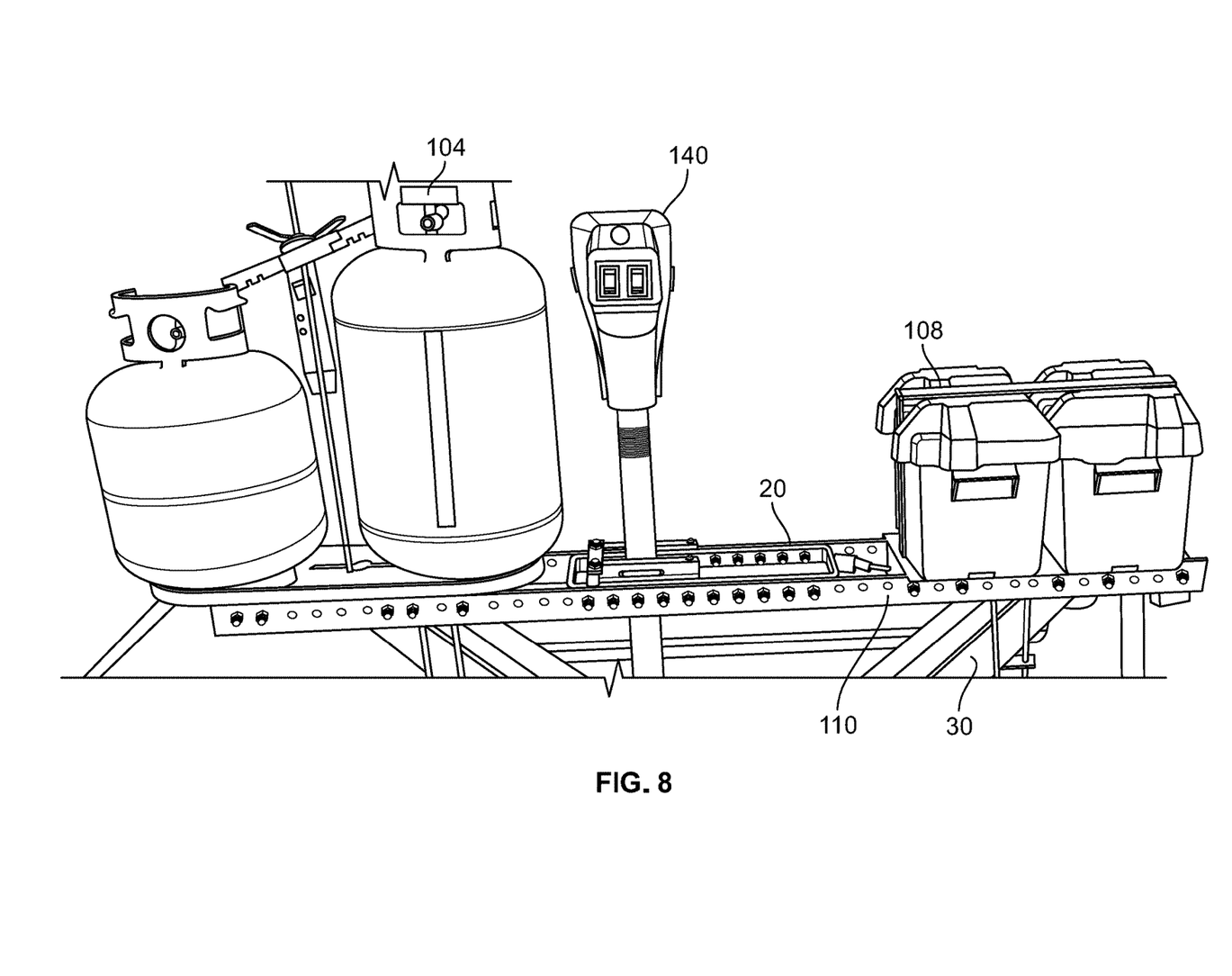
FIG. 8 shows a view of an example of a translationally maneuverable trailer jack track system shown as installed on a trailer mount with extended mounting rails.

Referring now to FIG. 8, a view of an example of a translationally maneuverable trailer jack track system shown as installed on a trailer mount with extended mounting rails is shown. The trailer jack frame 20 may advantageously be mounted on a trailer frame 30 and attached between extended parallel rails 110. The extended rails may advantageously be sized to accommodate mounted components which are typically used on recreational vehicles (RVs) and the like. Such components can include, but are not limited to, for example, propane tanks 104 and batteries 108 or similarly sized apparatus.

In certain embodiments the frame may comprise strong metal components as used in the trailer industry. For example, the extension rails may comprise 0.5-inch steel bars attached to the frame 20 using metal nuts, bolts and washers centered at about one inch or two inch intervals or as desired depending on the application and materials used. The carriage may have a length of about 6 inches and a width of about 4-5 inches. The length of frame 20 and all of the components can vary depending upon the application but a useful length is about 15-20 inches with a width in the range of 6-10 inches, depending on the applications. The jack collar is sized to snugly receive a jack housing and so depends on the size of the jack used, but a diameter of about 2-3 inches has been found to be useful. A typical industry standard is 2.25 inches.

Having described the construction and components in detail, a description of the operation of the system will now be described to promote further understanding of the novel features presented. Referring to the description and drawings hereinabove, in operation, when the drive screw is turned the carriage will be translationally driven in a linear direction corresponding to the direction of rotation of the drive screw. The carriage moves translationally within the frame guided elongated slotted side elements relative to a fixed point on the ground defined by the placement of the jack base. Since the jack base is fixed, when the frame 20 is attached to a trailer frame 30 and a stationary jack is affixed within the jack collar, the driver operates to laterally move the trailer's coupler into a coupling position over a coupling ball. The jack can then be lowered to drop the coupler onto the ball and the coupler is locked into position. The trailer is then ready to haul.

Figure 9:
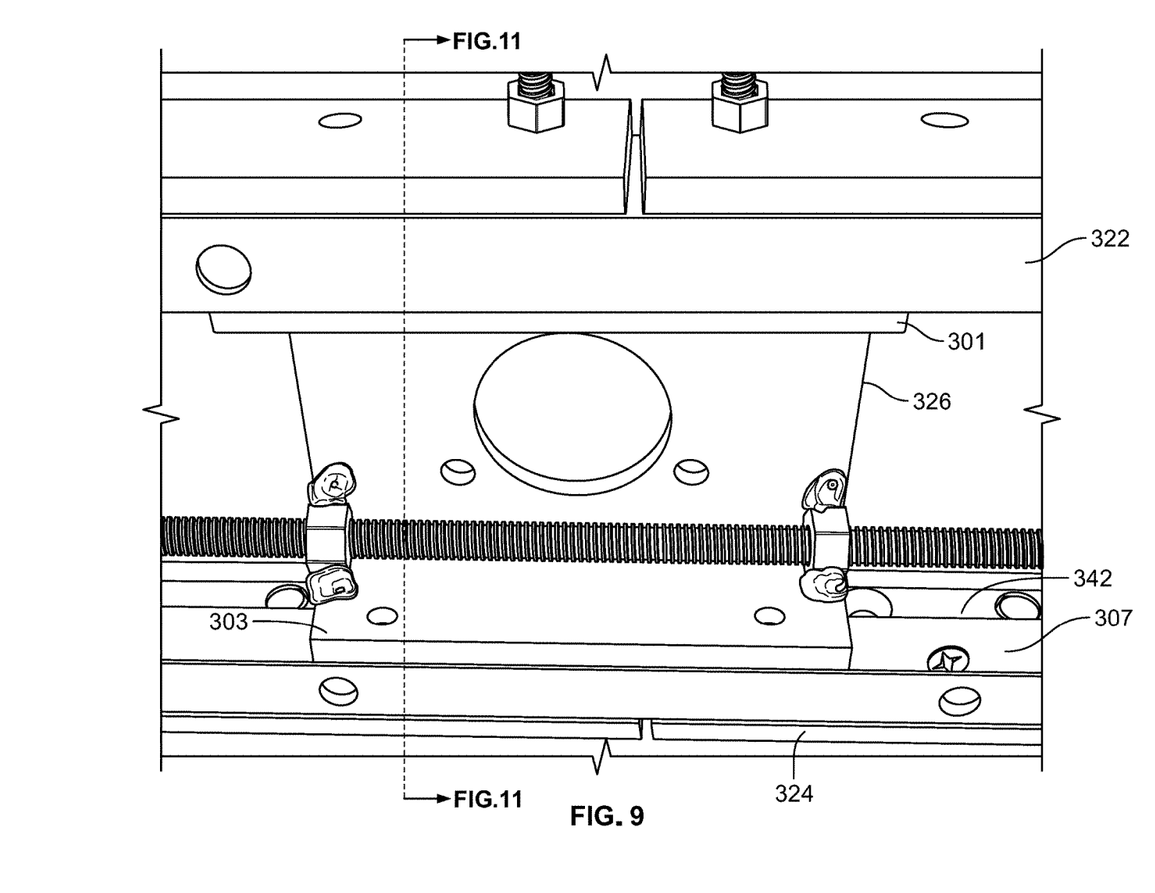
FIG. 9 shows a bottom view of an example of a translationally maneuverable trailer jack track system illustrating details of an alternate carriage drive mechanism.

Referring now to FIG. 9, a bottom view of an example of a translationally maneuverable trailer jack track system illustrating details of an alternate carriage drive mechanism is shown. A carriage 326 has opposing flanges 301, 303 movably disposed within the dual opposing elongated slotted side elements 322, 324. The dual opposing elongated slotted side elements 322, 324 each include a low friction rail 307 affixed within the slots 342.

Figure 10:
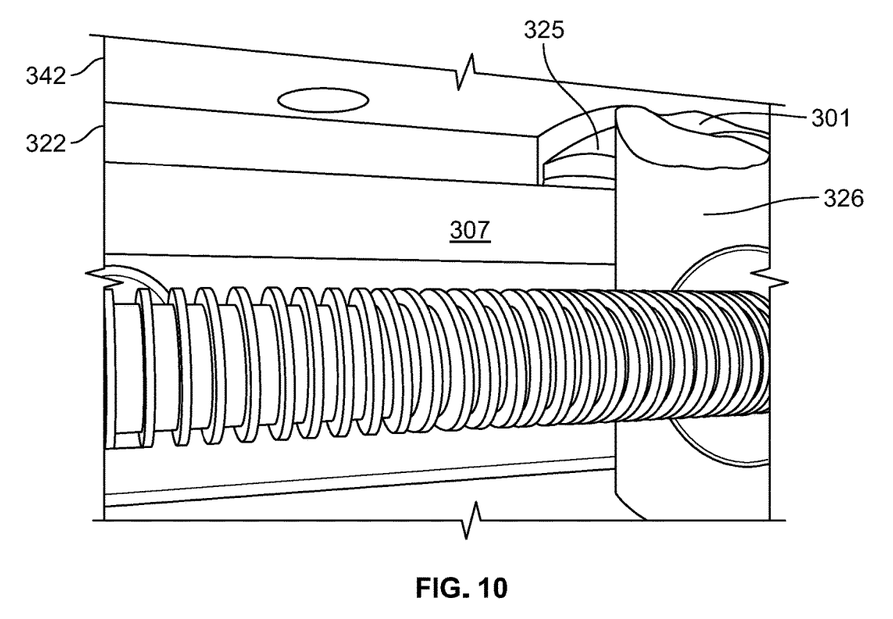
FIG. 10 shows a more detailed bottom view illustrating details of the alternate carriage drive mechanism.

Referring now to FIG. 10, a more detailed bottom view illustrating details of the alternate carriage drive mechanism is shown. One of the opposing elongated slotted side elements 322 is shown in a more detailed view of the inside of the element. Affixed inside one of the slots 342 is a first low friction rail 307. A second low friction rail (not shown) is identically attached to the opposite slotted side element 324. The carriage 326 is slidably coupled to the rail by flange 301. Flange 301 includes a bearing element 325 affixed on the flange 301 and slidingly bearing on the rail 307. The low friction rail and the bearing element may comprise a material such as nylon, plastic, acrylic or any useful material having a low friction surface. In operation, the maneuverable jack system operates similarly to the example described above using roller bearings.

Figure 11:
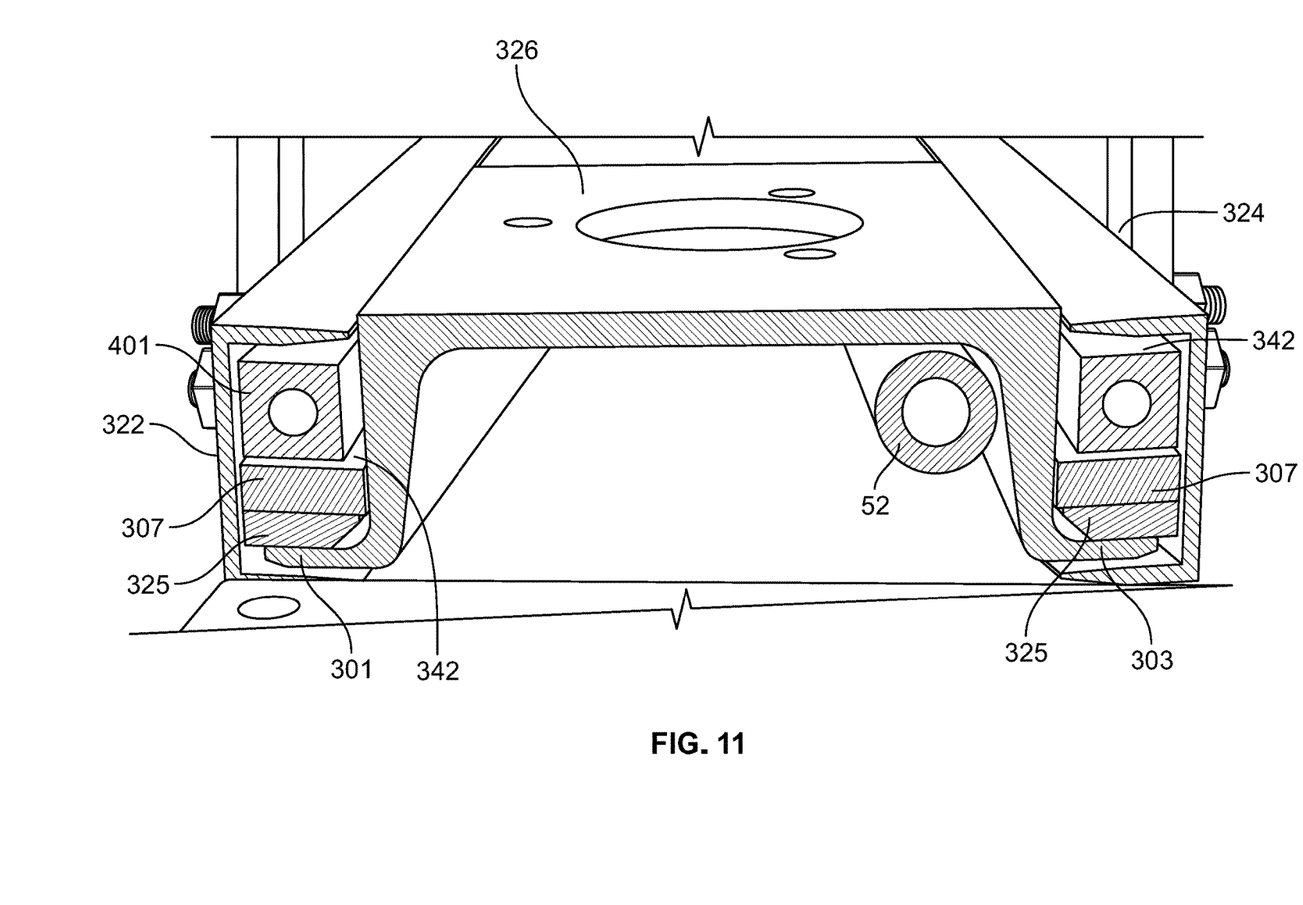
FIG. 11 schematically shows a cut away end view illustrating details of the alternate carriage drive mechanism.

Referring now to FIG. 11, a cut away end view illustrating details of the alternate carriage drive mechanism is shown. Each of the opposing elongated slotted side elements 322, 324 is affixed to a low friction rail 307 held within an interior slot 342. The carriage 326 is slidably coupled to the rail by a pair of flanges 301, 303. Each flange includes a bearing element 325 affixed on the flange 301 and slidingly bearing on the rail 307. The bearing elements and rails may each have a rectangular cross-section with a flat bearing surface. The low friction rail and the bearing element may comprise a material such as nylon, plastic, acrylic or any useful material having a low friction surface. A pair of opposing spacer rail elements 401 may be used if necessary to hold the components firmly in place.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment, and devices, and that various modifications, both as to the equipment details and operating procedures, may be accomplished without departing from the true spirit and scope of the present invention.

What is claimed is:

1. A translationally maneuverable trailer jack track system comprising:
   an adjustably mountable frame including dual opposing elongated slotted sides, the adjustable frame being mounted on a trailer frame between first and second angled arms of the trailer frame terminating in a ball coupler;
   where the adjustably mountable frame is attached to a first plurality of fasteners adapted to be adjustably mounted on the trailer frame so as to set back the adjustably mountable frame into a jack back position at a distance between 2 and 3 feet behind the ball coupler so as to allow an access space when the trailer is attached to a vehicle;
   a carriage mounted to the adjustably mountable frame with opposing side elements movably disposed within the dual opposing elongated slotted side elements, where the carriage has a centrally located jack collar and at least one threaded receiving element;
   a jack having an outer housing rigidly affixed to the carriage jack collar, where the jack includes a base within the jack housing adapted to firmly contact the ground;
   wherein the opposing side elements comprise opposing flanges movably disposed within the dual opposing elongated slotted side elements, the dual opposing elongated slotted side elements each include a low friction rail affixed within the slots, and wherein each of the opposing flanges slidingly bear upon one of the low friction rails;
   a drive screw traversing the frame lengthwise and threaded through the carriage threaded receiving element, where the drive screw is constrained on one end by a fastening device and has a drive cap on the other end;
   where rotation of the drive screw translationally moves the carriage relatively to a fixed point on the ground causing the ball coupler to move laterally; and
   wherein the adjustably mountable frame further includes a plurality of parallel extended rails affixed lengthwise to the adjustably mountable frame and sized to accommodate mounted RV components selected from the group consisting of propane tanks and batteries and wherein the parallel extension rails are made from steel bars attached to the adjustably mountable frame with a second plurality of fasteners centered on each extended rail between one inch and two inch intervals.

2. The system of claim 1 wherein the drive screw runs through the frame parallel to opposing parallel frame sides and through first and second opposing frame ends.

3. The system of claim 1 where the jack is a motorized jack.

4. The system of claim 1 wherein the drive screw is a motorized drive screw controlled by a wireless controller or a wired electronic controller.

5. The system of claim 1, wherein the drive screw is a motorized drive screw.

\* \* \* \* \*